(12) United States Patent
Russ et al.

(10) Patent No.: US 6,183,522 B1
(45) Date of Patent: Feb. 6, 2001

(54) DYE MIXTURES COMPRISING WATER-SOLUBLE FIBER-REACTIVE AZO DYES, PREPARATION THEREOF AND USE THEREOF

(75) Inventors: Werner Russ, Flörsheim-Weilbach; Bengt-Thomas Gröbel, Niederems; Christian Schumacher, Kelkheim, all of (DE)

(73) Assignee: Dystar Textilfarben GmbH & Co. (DE)

( * ) Notice: Under 35 U.S.C. 154(b), the term of this patent shall be extended for 0 days.

(21) Appl. No.: 09/356,846

(22) Filed: Jul. 19, 1999

(30) Foreign Application Priority Data

Jul. 21, 1998 (DE) .............................. 198 32 604
Sep. 17, 1998 (DE) .............................. 198 42 580

(51) Int. Cl.$^7$ .......................... C09B 67/24; D06P 1/382; D06P 1/384; D06P 3/66
(52) U.S. Cl. ........................... 8/549; 8/641; 8/918; 8/924
(58) Field of Search ................... 8/549, 641, 918–924

(56) References Cited

U.S. PATENT DOCUMENTS

| | | | |
|---|---|---|---|
| 4,988,803 | 1/1991 | Stöhr et al. | 534/635 |
| 5,097,021 | 3/1992 | Stöhr et al. | 534/635 |
| 5,304,221 | 4/1994 | Schwarz et al. . | |
| 5,342,927 | 8/1994 | Reddig et al. | 534/618 |
| 5,428,141 | 6/1995 | Herd et al. . | |
| 5,541,300 | 7/1996 | Bootz et al. | 534/605 |
| 5,548,072 | 8/1996 | Dannheim et al. | 534/635 |
| 5,556,435 * | 9/1996 | Russ et al. . | |
| 5,980,590 | 11/1999 | Russ et al. . | |

FOREIGN PATENT DOCUMENTS

| | | |
|---|---|---|
| 195 19 620 | 12/1996 | (DE) . |
| 0 546 372 | 6/1993 | (EP) . |
| 0 719 841 | 7/1996 | (EP) . |

* cited by examiner

*Primary Examiner*—Margaret Einsmann
(74) *Attorney, Agent, or Firm*—Connolly, Bove, Lodge & Hutz LLP

(57) ABSTRACT

Described are dye mixtures comprising one or more azo dyes (1) and one or more azo dyes (2) or (3) or (2) and (3), all these azo dyes containing a 1-(halotriazinylamino)-3,6- or -4,6-disulfo-8-naphthol coupling component and the third substituent in the triazine moiety of (1) and similarly of (2) and of (3) being an optionally alkyl- and/or phenyl-substituted amino radical or heterocyclic radical and the diazo component in (1) containing a fiber-reactive group of the vinyl sulfone series and being an optionally alkyl- and/or alkoxy-substituted phenyl or optionally sulfo-substituted naphthyl radical, in (2) being an optionally alkyl-, alkoxy-, chlorine-, bromine-, sulfo- and/or carboxyl-substituted phenyl or optionally sulfo-substituted naphthyl radical and in (3) being a sulfophenyl radical which, attached via an amino group, possesses a fiber-reactive halopyrimidine radical or a halotriazine radical having a fiber-reactive group of the vinyl sulfone series. The dye mixtures are very useful for dyeing hydroxyl- and/or carboxamido-containing materials, especially fiber materials, in deep bluish to yellowish red shades.

19 Claims, No Drawings

DYE MIXTURES COMPRISING WATER-SOLUBLE FIBER-REACTIVE AZO DYES, PREPARATION THEREOF AND USE THEREOF

Dye mixtures comprising water-soluble fiber-reactive azo dyes, preparation thereof and use thereof This invention relates to the technical field of fiber-reactive azo dyes.

U.S. Pat. Nos. 4988803, 5097021, 5342927, 5541300 and 5548072 disclose monoazo dyes containing a fiber-reactive radical of the amino-substituted halotriazinylamino series with or without a further fiber-reactive radical of the vinyl sulfone or fluoropyrimidinyl series. However, the dyes described therein have certain application defects, for example an excessive dependence of the color yield on changing dyeing parameters in the dyeing process, an insufficient solubility in the aqueous dyebath at higher dyeconcentrations in the presence of electrolyte salts or an insufficient color build-up on cotton and especially viscose (good color build-up follows from the ability of a dye to produce a correspondingly stronger dyeing from an increased dye concentration in the dyebath). Possible consequences of these shortcomings are poor reproducibilities for the dyeings which are obtainable.

However, it is particularly important to obtain dyeings having a good color yield, i.e., dyeings whose depth of shade is very high in relation to the amount of dye used, for example in comparison with other dyes, because of the coloring property of the dye itself (high absorbance) and because of the dyeing characteristics of this dye, such as good affinity and a high yield of fixation. If mixtures of dyes having a certain color yield are used, the color yield of this mixture of dyes will generally be the average of the color yields of the individual dyes. The color yield of a mixture of, for example, two dyes will therefore be lower than the color yield of that dye having the larger color yield property.

The present invention, then, provides dye mixtures which provide dyeings having a color yield which is surprisingly distinctly higher than the average of the color yields of the dyeings of the individual dyes in the dye mixture. This synergistic effect also shows itself in improved build-up characteristics on the part of the mixture of the invention compared with the individual dyes in the mixture.

The invention accordingly provides dye mixtures comprising at least 2, such as 3 or 4, preferably 3 and particularly preferably 2, dyes selected from the group of the dyes of the general formulae (1), (2) and (3), where at least one of the dyes conforms to the general formula (1):

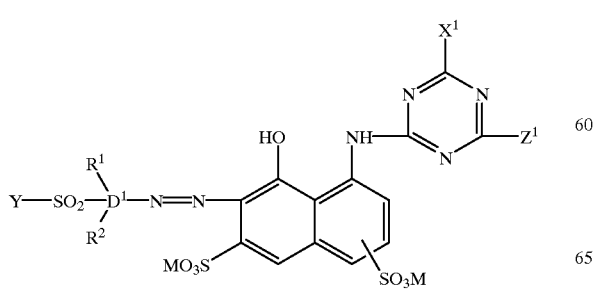

(1)

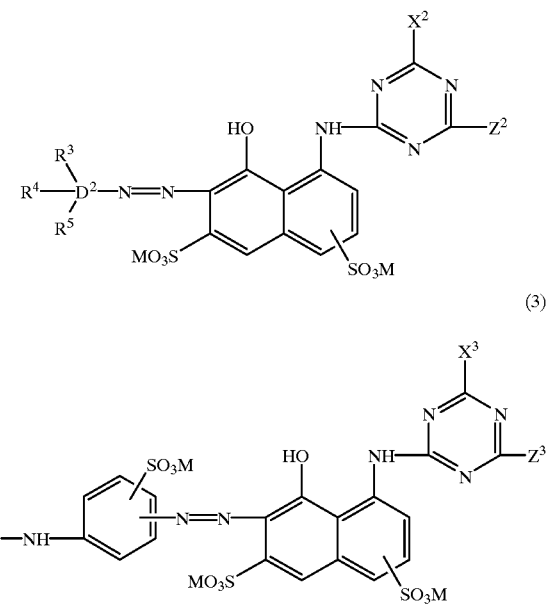

where:
M is hydrogen or an alkali metal, such as sodium, potassium or lithium;
$D^1$ is a benzene or naphthalene radical;
$D^2$ is a benzene or naphthalene radical;
Y is vinyl or is ethyl which is substituted in the β-position by an alkali-eliminable substituent, for example by chlorine, sulfato, thiosulfato, phosphate, alkanoyloxy of 2 to 5 carbon atoms, such as acetyloxy, and sulfobenzoyloxy, and is preferably vinyl or β-sulfatoethyl;
$R^1$ is hydrogen, alkyl of 1 to 4 carbon atoms, such as ethyl and especially methyl, or alkoxy of 1 to 4 carbon atoms, such as ethoxy and especially methoxy, when $D^1$ is a benzene radical, preferably hydrogen, methyl and methoxy, especially hydrogen, or is hydrogen or sulfo, preferably hydrogen, when $D^1$ is a naphthalene radical;
$R^2$ is hydrogen, alkyl of 1 to 4 carbon atoms, such as ethyl and especially methyl, or alkoxy of 1 to 4 carbon atoms, such as ethoxy and especially methoxy, when $D^1$ is a benzene radical, preferably hydrogen, methyl and methoxy, especially hydrogen, or is hydrogen or sulfo, preferably sulfo, when $D^1$ is a naphthalene radical;
$R^3$ is hydrogen, alkyl of 1 to 4 carbon atoms, such as ethyl and especially methyl, alkoxy of 1 to 4 carbon atoms, such as ethoxy and especially methoxy, carboxyl or sulfo, when $D^2$ is a benzene radical, preferably hydrogen, methyl and methoxy, or is hydrogen or sulfo, preferably hydrogen, when $D^2$ is a naphthalene radical;
$R^4$ is hydrogen, alkyl of 1 to 4 carbon atoms, such as ethyl and especially methyl, alkoxy of 1 to 4 carbon atoms, such as ethoxy and especially methoxy, or sulfo, when $D^2$ is a benzene radical, preferably hydrogen, methyl, methoxy or sulfo, especially hydrogen or sulfo, or is hydrogen or sulfo, preferably sulfo, when $D^2$ is a naphthalene radical;
$R^5$ is hydrogen, chlorine, bromine or sulfo when $D^2$ is a benzene radical, preferably hydrogen, or is hydrogen or sulfo when $D^2$ is a naphthalene radical;

$X^1$ is fluorine, bromine or chlorine, preferably chlorine and especially fluorine;

$X^2$ is fluorine, bromine or chlorine, preferably chlorine and especially fluorine;

$Z^1$ is a group of the general formula (4a) or (4b) and preferably a group of the general formula (4a)

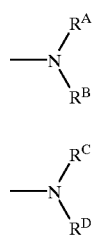

(4a)

(4b)

where $R^A$ is hydrogen or alkyl of 1 to 4 carbon atoms, such as methyl and especially ethyl, which may be substituted, for example by sulfo, carboxyl, methoxy, ethoxy, sulfato, phosphate, acetoxy or propionyloxy, preferably by hydroxyl, and is preferably hydrogen or β-hydroxyethyl, $R^B$ is hydrogen or alkyl of 1 to 4 carbon atoms, such as methyl and especially ethyl, which may be substituted, for example by sulfo, carboxyl, methoxy, ethoxy, sulfato, phosphate, acetoxy or propionyloxy, preferably by hydroxyl, and is preferably hydrogen or β-hydroxyethyl, or the group —$NR^A R^B$ forms the radical of a 5- to 7-membered saturated heterocycle wherein the alkylene radical of this heterocycle may be additionally interrupted by 1 or 2, preferably 1, hetero groups, such as —O— and —NH—, and is preferably piperidino, piperazino and especially morpholino, $R^C$ is hydrogen or alkyl of 1 to 4 carbon atoms, such as methyl or ethyl, or alkyl of 1 to 4 carbon atoms, such as methyl and especially ethyl, which may be substituted, for example by sulfo, carboxyl, sulfato or especially hydroxyl, and is preferably hydrogen or β-hydroxyethyl, and $R^D$ is hydrogen or phenyl, which may be substituted by 1 or 2 substituents selected from the group consisting of alkyl of 1 to 4 carbon atoms, such as ethyl and especially methyl, alkoxy of 1 to 4 carbon atoms, such as ethoxy and especially methoxy, carboxyl, sulfo and chlorine, and is preferably phenyl which is substituted by a substituent selected from the group consisting of sulfo and chlorine;

$Z^2$ has one of the meanings mentioned for $Z^1$ and is preferably a group of the general formula (4b);

$X^3$ is fluorine, bromine or chlorine, preferably chlorine or especially fluorine;

$Z^3$ has one of the meanings mentioned for $Z^1$ and is preferably a group of the general formula (4a);

$Z^0$ is a group of the general formula (5a), (5b), (5c) or (5d)

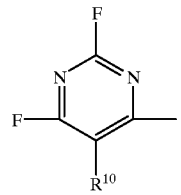

(5a)

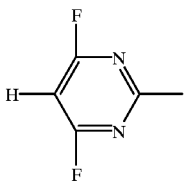

(5b)

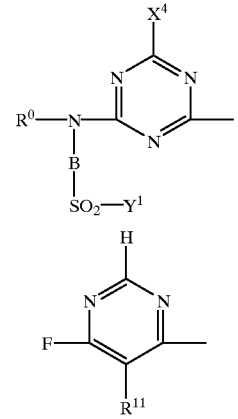

(5c)

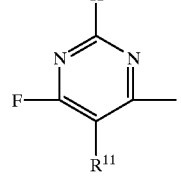

(5d)

where $R^{10}$ is hydrogen or chlorine;
$R^{11}$ is hydrogen, chlorine or fluorine;
$R^0$ is hydrogen, alkyl of 1 to 4 carbon atoms, such as ethyl and especially methyl, phenyl or chlorine-, sulfo-, methyl-, ethyl-, methoxy-, ethoxy- or carboxyl-substituted phenyl;
$X^4$ has one of the meanings of $X^1$;
$Y^1$ has one of the meanings of Y;
B is alkylene of 2 to 6 carbon atoms, such as n-ethylene and n-propylene, or is alkylenephenylene or phenylenealkylene each containing an alkylene of 2 to 4 carbon atoms, such as n-ethylene or n-propylene, wherein the phenyl radicals may be additionally substituted by 1 or 2 substituents selected from the group consisting of methyl, methoxy, ethyl and ethoxy, or is alkylene of 3 to 8 carbon atoms which is interrupted by 1 or 2 hetero groups, such as —O— and —NH—, for example a —$(CH_2)_2$—O—$(CH_2)$-group;

the one —$SO_3M$ group in the sulfoaminonaphthol radicals of the formulae (1), (2), (3) is attached to the naphthalene radical in a position which is meta or para, preferably meta, relative to the NH group;

the azo group in the formula (3) is attached to the benzene nucleus in a position which is meta or para, preferably meta, relative to the $Z^0$—NH-group, wherein the —$SO_3M$ group there is preferably attached to the benzene nucleus in a position which is ortho relative to the azo group.

In the above general formulae and also in the subsequent general formulae, the individual constituents of the formulae, whether they bear identical or different designations, can have meanings under their definition which are mutually identical or different. The terms "sulfo", "thiosulfato", "carboxyl", "phosphate" and "sulfato" cover not only the acid form but also the salt form of the respective groups. Accordingly, sulfo groups are groups conforming to the general formula —SO$_3$M, thiosulfato groups are groups conforming to the general formula —S—SO$_3$M, carboxyl groups are groups conforming to the general formula —COOM, phosphate groups are groups conforming to the general formula —OPO$_3$M$_2$ and sulfato groups are groups conforming to the general formula —OSO$_3$M, where each M is as defined above.

Preference is given to dye mixtures comprising one or more, such as two or three, preferably one, dyes of the general formula (1) and one or more, such as two or three or four, preferably one or two, dyes of the general formula (2) or (3) or (2) and (3) where $X^1$, $X^2$ and $X^3$ all have the same meaning and $Z^1$ and $Z^2$ preferably have the same meaning.

In general, the dye or dyes of the general formula (1) and the dye or dyes of the general formula (2) or (3) or (2) and (3) are present in the mixture in a mixing ratio of 90:10% by weight to 10:90% by weight, preferably in a ratio of 70:30% by weight to 30:70% by weight, particularly preferably in a ratio of 60:40 to 40:60% by weight. When the mixture comprises dyes of the general formulae (2) and (3), these in turn are generally present in a mixing ratio of 90:10% by weight to 10:90% by weight.

Groups conforming to the general formula Y—SO$_2$—D$^1$ (R$^1$,R$^2$)— are for example 3-(β-sulfatoethylsulfonyl)phenyl, 4-(β-sulfatoethylsulfonyl)phenyl, 2-methyl-5-(β-sulfatoethylsulfonyl)phenyl, 2-methoxy-5-(β-sulfatoethylsulfonyl)phenyl, 4-methyl-3-(β-sulfatoethylsulfonyl)phenyl, 2,5-dimethyl-4-(β-sulfatoethylsulfonyl)phenyl, 2,6-dimethyl-4-(β-sulfatoethylsulfonyl)phenyl, 2-methoxy-4-(β-sulfatoethylsulfonyl)phenyl, 4-methoxy-5-(β-sulfatoethylsulfonyl)phenyl, 2-methoxy-5-methyl-4-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 6-(β-sulfatoethylsulfonyl)-1-sulfonaphth-2-yl and 8-(β-sulfatoethylsulfonyl)-6-sulfonaphth-2-yl, especially 4-(β-sulfatoethylsulfonyl) phenyl, and also derivatives thereof in which the β-sulfatoethylsulfonyl group is replaced by vinylsulfonyl or β-thiosulfatoethylsulfonyl or β-chloroethylsulfonyl.

Groups of the general formula D$^2$(R$^3$,R$^4$,R$^5$)— are for example 2-sulfophenyl, 4-sulfophenyl, 3-sulfophenyl, 2,5-disulfophenyl, 4-methyl-2-sulfophenyl, 1-sulfonaphth-2-yl, 6-sulfonaphth-2-yl, 8-sulfonaphth-2-yl, 1,5-disulfonaphth-2-yl, 1,6-disulfonaphth-2-yl and 6,8-disulfonaphth-2-yl.

Groups of the formula (4b) are for example 2-methylphenylamino, 2-chlorophenylamino, 2-sulfophenylamino, 4-sulfophenylamino and especially phenylamino, 4-chlorophenylamino and 3-sulfophenylamino.

The dye mixtures of the invention are preparable in a conventional manner, for example by mechanically mixing the individual dyes, whether in the form of their dye powders or granules or their as-synthesized solutions or in the form of aqueous solutions of the individual dyes in general, which may further include customary auxiliaries, or by chemical synthesis in a one-pot reaction, for example by using the diazo components and coupling components of the individual dyes in the same reaction batch and the halotriazine or halopyrimidine compounds in the reaction with the amino-containing coupling components or aminoazo starting compounds, in each case by using the individual dyes or reaction components in the proportions required. Such methods of syntheses are familiar to those skilled in the art. For instance, in one possible procedure, one or more, such as two or three, azo compounds of the general formula (6A) and one or more, such as two, three or four, azo compounds of the general formulae (6B) or (6C) or (6B) and (6C)

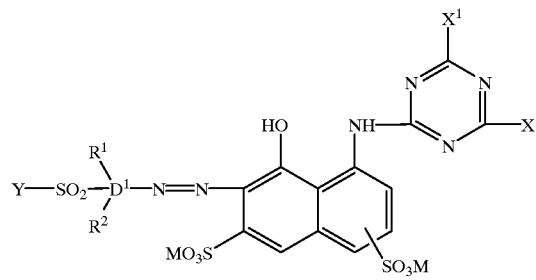

(6A)

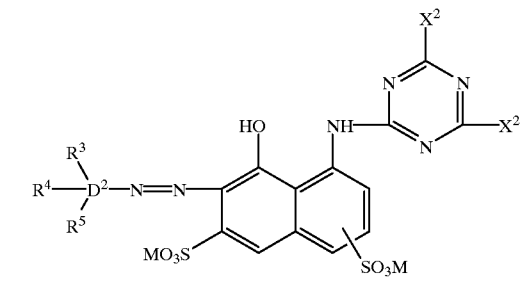

(6B)

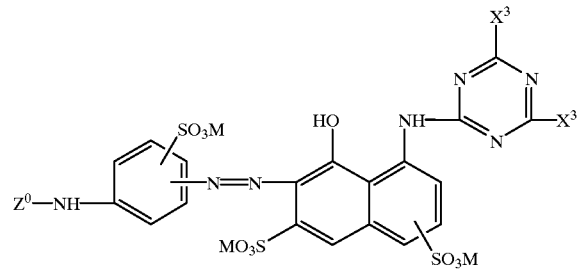

(6C)

where the individual constituents of the formulae are each as defined at the beginning, are reacted together in the same reaction batch with one or more, such as two or three, amino compounds conforming to the general formulae H-Z$^1$, H-Z$^2$ and/or H-Z$^3$ in a conventional manner, for example at a temperature between 10 and 60° C., preferably between 20 and 40° C., and at a pH between 2 and 8, preferably between 4 and 5. However, a dye mixture according to the invention may also be synthesized by starting from the conventional starting compounds of the general formulae (7A) and (7B) or (7C) or (7B) and (7C)

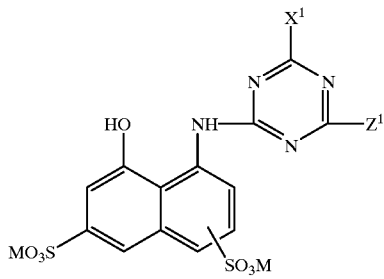

(7A)

-continued

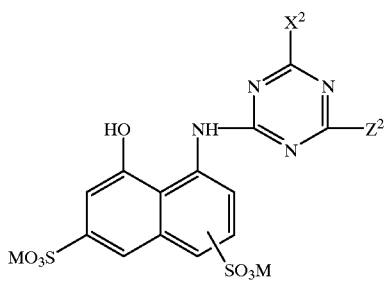

(7B)

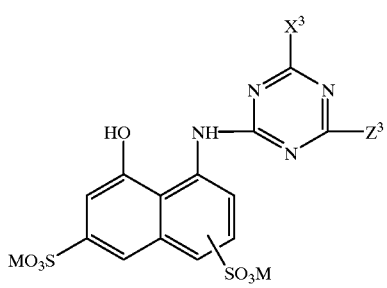

(7C)

where M, $X^1$, $X^2$, $X^3$, $Z^1$, $Z^2$ and $Z^3$ are each as defined above, and coupling these in the corresponding proportions together with the particular amino compounds conforming to the general formulae Y—SO$_2$—D$^1$(R$^1$R$^2$)—NH$_2$, D$^2$(R$^3$, R$^4$,R$^5$)—NH$_2$ and optionally of the general formula (8)

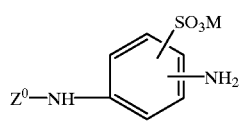

(8)

where $Z^0$ and M are each as defined above, for example at a temperature between 0 and 30° C., preferably between 10 and 20° C., and at a pH between 3 and 7.5, preferably between 4.5 and 6.5, following their diazotization.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium acetate, sodium citrate, sodium borate, sodium bicarbonate, sodium dihydrogenphosphate and disodium hydrogenphosphate, dyeing auxiliaries, dustproofing agents and small amounts of siccatives; if they are present in a liquid, aqueous solution (including the presence of thickeners of the type customary in print pastes), they may also include substances which ensure a long life for these preparations, for example mold preventatives.

In solid form, the dye mixtures of the invention are generally present as pulverulent or granular preparations which include an electrolyte salt with or without one or more of the abovementioned auxiliaries. The dye mixture fraction in the preparations ranges from 10 to 80% by weight, based on the preparation. The buffer substances are generally present in a total amount of up to 5% by weight, based on the preparation. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 5% by weight, preferably up to 2% by weight.

The separation from their synthesis solution of the chemically produced dye mixtures of the invention can be effected by commonly known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention may include further fiber-reactive dyes which are used for shading the dye mixture; in an amount of up to 5% by weight. These "shading dyes" can be added by customary mixing or else be prepared chemically in the same reaction batch together with the above-described synthesis of a dye mixture of the invention and be incorporated into the dye mixture when one or more of the components of the shading dye are identical with the components of the dyes of the formulae (1), (2) and/or (3). For instance, to prepare a dye mixture according to the invention which includes a shading dye having a certain chromophore, it is possible to use such additional starting compounds in the reaction batch as, instead of the 3,6-disulfo-1-amino-8-naphthol component of the dyes (1), (2) and/or (3), contain, as component, 4,6-disulfo-1-amino-8-naphthol or 2- or 3-amino-6-sulfo-8-naphthol or a 1-(aminophenyl)-3-carboxy- or -3-methyl-5-pyrazolone.

The dye mixtures of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions obtained in the synthesis of the dye mixtures of the invention, if desired after addition of a buffer substance, and also if desired after concentrating or diluting, can be used directly as liquid preparation for dyeing.

The present invention thus also provides for the use of the dye mixtures of the invention for dyeing or printing these materials, or rather to processes for dyeing or printing these materials in a conventional manner, by using a dye mixture of the invention or its individual components (dyes) individually together as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes. For instance, on cellulose fibers they produce from a long liquor by the exhaust method and by means of various acid-binding agents with or without neutral salts, such as sodium chloride or sodium sulfate, dyeings having very good color yields which are improved compared with the individual dyes. They are preferably applied from an aqueous bath at temperatures between 40 and 105° C., if desired at temperatures up to 130° C. under superatmospheric pressure, and if desired in the presence of customary dyeing auxiliaries. One possible procedure is to introduce the material into the warm bath and to gradually heat the bath to the desired dyeing temperature and to complete the dyeing process at that temperature. The neutral salts which speed up the exhaustion of the dyes can if desired not be added to the bath until after the actual dyeing temperature has been reached.

The padding process likewise produces excellent color yields and a very good color build-up on cellulose fibers, on which fixing can be effected by batching at room temperature or elevated temperature, for example at up to about 60° C., by steaming or with dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print paste and subsequent fixation either by passing the printed material through a hot electrolyte-comprising alkaline bath or by overpadding with an alkaline electrolyte-comprising padding liquor with subsequent batching of this treated material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate. The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and especially very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. H. Rath, Lehrbuch derTextilchemie, Springer-Verlag, 3rd Edition (1972), p. 295–299, especially the finish by the so-called Hercosett process (p. 298); J. Soc. Dyers and Colourists 1972, 93–99, and 1975, 33–44) can be dyed with very good fastness properties. The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaustion process initially from an acidic dyebath having a pH of about 3.5 to 5.5 under pH control and the pH is then, toward the end of the dyeing time, shifted into the neutral and perhaps weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention produce bright, yellowish to bluish red dyeings on the materials mentioned, preferably fiber materials.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of the free acids; in general, they are prepared and isolated in the form of their salts, preferably sodium or potassium salts, and used for dyeing in the form of their salts. The starting compounds mentioned in the form of the free acid in the following examples, especially table examples, can similarly be used in the synthesis as such or in the form of their salts, preferably alkali metal salts, such as sodium or potassium salts.

EXAMPLE 1

A pH 8.5 solution of 319.2 parts of 1-amino-8-naphthol-3,6-disulfonic acid in 1000 parts of water is admixed with about 300 parts of ice; 141.8 parts of cyanuric fluoride are added at 0° C. with thorough stirring, and the batch is subsequently stirred for a short time longer and then admixed with 90 parts of morpholine. The reaction takes place at a pH maintained (by addition of sodium bicarbonate, for example) between 7.5 and 8.5, whilst the batch is gradually allowed to warm to 15° C. and is subsequently stirred for some time longer.

This synthesis batch is then admixed with about 2000 parts of a conventionally prepared solution (acidified with sulfuric acid) of two diazonium salts formed from 140.7 parts of 4-(β-sulfatoethylsulfonyl)aniline and 111.6 parts of 1-sulfo-2-aminonaphthalene, and the two coupling reactions are carried out at a pH between 3.0 and 6.5 and at a temperature of about 15 to 20° C. with thorough stirring. After the coupling reactions have ended, a pH between 7.0 and 7.5 is set by means of sodium carbonate, the reaction batch is clarified and the filtrate is spray-dried.

The powder obtained has a 60% content of the alkali metal salts of the dyes of the formulae (A) and (B)

properties, especially very good wash, light, alkali, acid, water, seawater, perspiration and rub fastness properties. The dyeings are also notable for their high degree of fixation and good build-up on the cellulose materials.

EXAMPLE 2

Example 1 is repeated with a diazonium salt solution of 2 diazonium salts which was prepared from 205.7 parts of 6-(β-sulfatoethylsulfonyl)-1-sulfo-2-aminonaphthalene and 111.6 parts of 1-sulfo-2-aminonaphthalene. This affords an electrolyte/dye powder having a dye content of about 65% of the dyes of the formula (B) and of the formula (C).

(A)

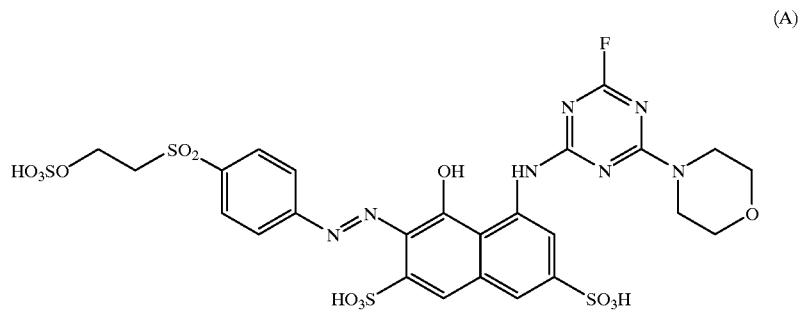

(B)

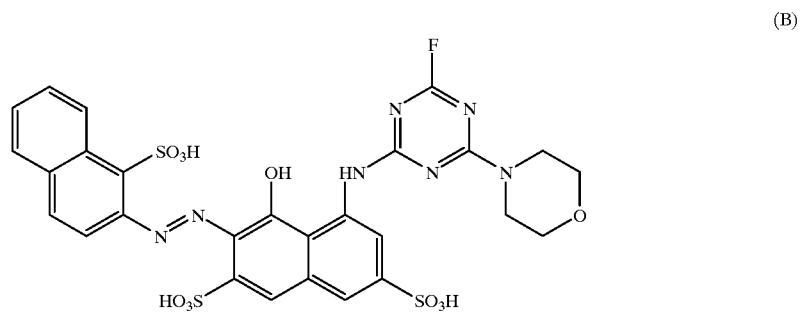

in approximately equal weight fractions as well as including electrolyte salt (predominantly sodium chloride and sodium sulfate). The dye mixture of the invention has very good dye properties and when applied by the application and fixing methods customary in the art for fiber-reactive dyes to the materials mentioned in the description part, such as cellulose fiber materials, especially cotton and viscose, produces strong red dyeings and prints having very good fastness (C)

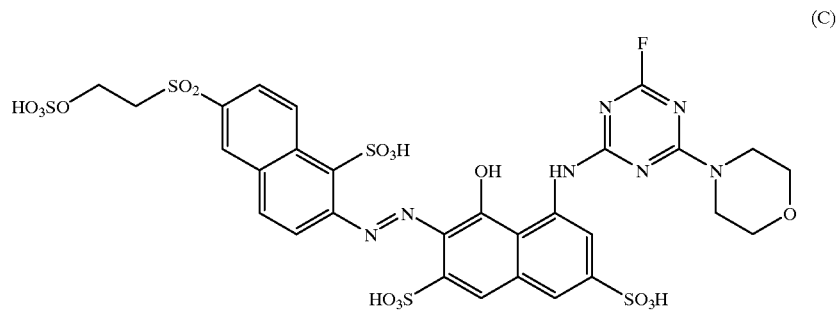

The dye (B) content is about 30% and the dye (C) content about 35%. The dye mixture of the invention provides by application according to the dyeing and printing methods customary in the art to the fiber materials mentioned in the description part, for example cotton, bluish red dyeings having good color build-up and excellent fastnesses to chlorinated water coupled with a high degree of fixation.

EXAMPLE 3

319 parts of 1-amino-8-naphthol-3,6-disulfonic acid, suspended in 1000 parts of water, are dissolved by addition of 90 parts of morpholine and 90 parts of sodium bicarbonate; about 500 parts of ice are added, and about 142 parts of cyanuric fluoride are sprayed under high pressure into this alkaline solution in a reactor so that there is no backmixing.

The resulting suspension, adjusted to a pH of about 8.5, is admixed with about 2000 parts of a conventionally prepared aqueous suspension, acidified with hydrochloric acid, of two diazonium salts of 62.1 parts of 3-(2',4'-difluoropyrimidin-6'-yl)amino-6-sulfoaminobenzene and 140.7 parts of 4-(β-sulfatoethylsulfonyl)aniline, and the coupling reactions of the two diazonium compounds with the coupling component are carried out a pH between 4.0 and 7.5 and at a temperature of about 15° C. in the course of about two hours. The synthesis batch obtained is then clarified by filtration and the filtrate comprising the two dyes of the formulae (A) and (D) (both in the form of the sodium salts)

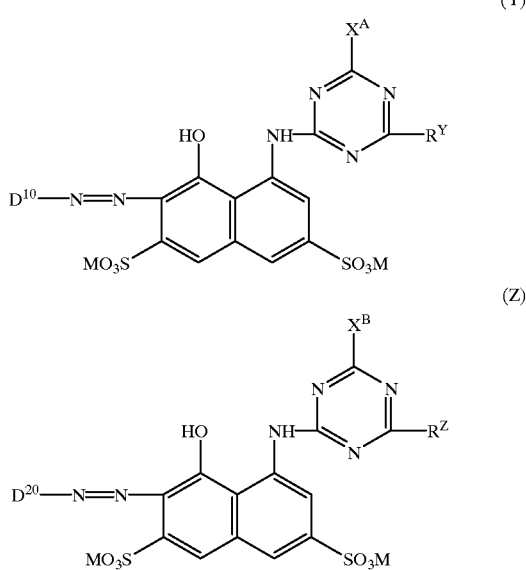

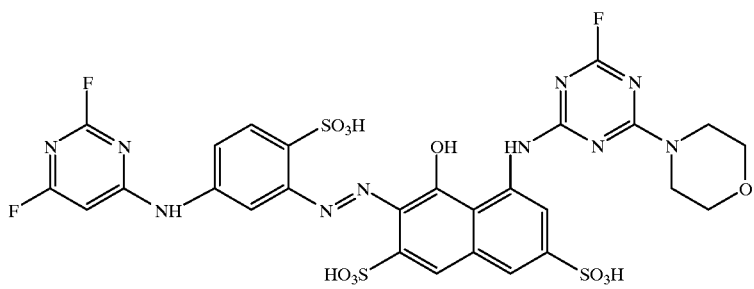

is subjected to a spray granulation process. The dye mixture obtained includes about 30% of the dye (A) and about 35% of the dye (D) as well as electrolyte salt. It is notable for excellent dye properties and when applied by the application and fixing methods customary in the art for fiber-reactive dyes to the materials mentioned in the description part, such as cellulose fiber materials, especially cotton and viscose, produces strong red dyeings having very good fastness properties, especially very good wash, light, alkali, acid, water, seawater, perspiration and rub fastness properties. The dye mixture is also notable for its minimal dependence on changing dyeing parameters and for a high degree of fixation and good build-up on the cellulose materials.

EXAMPLES 3 TO 27

The table examples which follow describe further inventive dye mixtures comprising the dyes conforming to the general formulae (Y) and (Z)

(where M is as defined in the description part) in terms of the components in the respective table example. They are preparable in a manner according to the invention either by mechanically mixing the individual dyes or else chemically, for example similarly to one of the above operative examples, with the aid of their starting components.

The dye mixtures of the invention possess very good application properties and provide on the materials mentioned in the description part, especially cellulose fiber materials, when applied by the dyeing and printing application methods customary in the art, preferably by the application and fixing methods customary in the art for fiber-reactive dyes, strong dyeings and prints having good fastness properties and a good color build-up in the hue reported in the respective table example. The numerical ratios reported in the MR column specify the mixing ratio of the two dyes to each other in % by weight.

| | Dye mixture comprising | | | | | | | |
|---|---|---|---|---|---|---|---|---|
| | Dye (Y) | | | Dye (Z) | | | MR of | |
| Ex. | $D^{10}$ | $X^A$ | $R^Y$ | $D^{20}$ | $X^B$ | $R^Z$ | (Y):(Z) | Hue |
| 4 | 1-sulfo-6-(β-sulfato-ethylsulfonyl)naphth-2-yl | fluorine | 3-sulfo-phenylamino | 3-(2',4'-difluoro-pyrimidin-6'-yl)-amino-6-sulfophenyl | fluorine | 3-sulfo-phenylamino | 70:30 | bluish red |
| 5 | 4-(β-sulfatoethyl-sulfonyl)phenyl | fluorine | morpholino | 3-(2',4'-difluoro-pyrimidin-6'-yl)-amino-6-sulfophenyl | fluorine | morpholino | 60:40 | red |
| 6 | 4-(β-sulfatoethyl-sulfonyl)phenyl | fluorine | piperidino | 3-(2',4'-difluoro-pyrimidin-6'-yl)-amino-6-sulfophenyl | fluorine | piperidino | 50:50 | red |
| 7 | 4-(β-sulfatoethyl-sulfonyl)phenyl | fluorine | phenylamino | 3-(2',4'-difluoro-pyrimidin-6'-yl)-amino-6-sulfophenyl | fluorine | phenylamino | 50:50 | red |
| 8 | 4-(β-sulfatoethyl-sulfonyl)phenyl | fluorine | 3-sulfo-phenylamino | 3-{2'-chloro-4'-[β-(4"-(β'-sulfatoethyl-sulfonyl-phenyl)ethylamino)-1',3',5'-triazin-6'-yl}-amino-6-sulfophenyl | fluorine | 3-sulfo-phenylamino | 50:50 | yellowish red |
| 9 | 4-(β-sulfatoethyl-sulfonyl)phenyl | fluorine | 4-chloro-phenylamino | 3-{2'-chloro-4'-N-phenyl-N-γ-(β'-sulfatoethyl-sulfonyl)propylamino-1',3',5'-triazin-6'-yl]}-6-sulfophenyl | fluorine | 4-chloro-phenylamino | 70:30 | yellowish red |
| 10 | 4-(β-sulfatoethyl-sulfonyl)phenyl | fluorine | N-ethyl-phenylamino | 3-{2'-chloro-4'-N-methyl-β-(β'-sulfato-ethyl-sulfonyl)ethylamino-1',3',5'-triazin-6'-yl]}amino-6-sulfophenyl | fluorine | N-ethyl-phenylamino | 50:50 | red |
| 11 | 4-(β-sulfatoethyl-sulfonyl)phenyl | fluorine | N-ethyl-phenylamino | 3-{2'-fluoro-4'-N-methyl-β-(β'-sulfato-ethylsulfonyl)ethyl-amino-1',3',5'-triazin-6'-yl]}amino-6-sulfophenyl | fluorine | N-ethyl-phenylamino | 50:50 | red |
| 12 | 4-(β-sulfatoethyl-sulfonyl)phenyl | fluorine | morpholino | 3-(4',5'-difluoro-pyrimidin-6'-yl)amino-6-sulfophenyl | fluorine | morpholino | 60:40 | red |
| 13 | 4-(β-sulfatoethyl-sulfonyl)phenyl | fluorine | morpholino | 3-(5'-chloro-2',4'-difluoropyrimidin-6'-yl)amino-6-sulfophenyl | fluorine | " | 50:50 | red |
| 14 | 4-(β-sulfatoethyl-sulfonyl)phenyl | fluorine | morpholino | 4-(2',4'-difluoro-pyrimidin-6'-yl)amino-3-sulfophenyl | fluorine | " | 50:50 | red |
| 15 | 4-(β-sulfatoethyl-sulfonyl)phenyl | chlorine | 3-sulfo-phenylamino | 3-(2',4'-difluoro-pyrimidin-6'-yl)amino-6-sulfophenyl | chlorine | 3-sulfo-phenylamino | 50:50 | red |
| 16 | 2,5-dimethoxy-4-(β-sulfatoethyl-sulfonyl)phenyl | chlorine | 4-sulfo-phenylamino | 3-{2'-chloro-4'-[β-(4"-(β'-sulfatoethyl-sulfonyl-phenyl)ethylamino]-1',3',5'-triazin-6'-yl}amino-6-sulfophenyl | chlorine | 4-sulfo-phenylamino | 60:40 | bluish red |
| 17 | 2-methoxy-5-(β-sulfatoethyl-sulfonyl)phenyl | chlorine | 2,5-disulfo-phenylamino | 3-{2'-chloro-4'-[β-(4"-(β'-sulfatoethyl-sulfonyl-phenyl)ethylamino]-1',3',5'-triazin-6'-yl}amino-6-sulfophenyl | chlorine | 2,5-disulfo-phenylamino | 40:60 | bluish red |
| 18 | 2-methoxy-5-methyl-4-(β-sulfatoethyl-sulfonyl)phenyl | chlorine | 2,4-disulfo-phenylamino | 3-{2'-chloro-4'-[β-(4"-(β'-sulfatoethyl-sulfonyl-phenyl)ethylamino]-1',3',5'-triazin-6'-yl}amino- | chlorine | 2,5-disulfo-phenylamino | 50:50 | bluish red |

TABLE-continued

| | Dye mixture comprising | | | | | | | |
|---|---|---|---|---|---|---|---|---|
| | Dye (Y) | | | Dye (Z) | | | MR of | |
| Ex. | $D^{10}$ | $X^A$ | $R^Y$ | $D^{20}$ | $X^B$ | $R^Z$ | (Y):(Z) | Hue |
| 19 | 3-(β-sulfatoethyl-sulfonyl)phenyl | chlorine | morpholino | 6-sulfophenyl 3-{2'-chloro-4'-N-γ-(β'-sulfatoethyl-sulfonyl)-propylamino-1',3',5'-triazin-6'-yl}amino-6-sulfophenyl | chlorine | morpholino | 30:70 | yellowish red |
| 20 | 4-(β-sulfatoethyl-sulfonyl)phenyl | fluorine | morpholino | 2-sulfophenyl | fluorine | " | 60:40 | yellowish red |
| 21 | 4-(β-sulfatoethyl-sulfonyl)phenyl | fluorine | morpholino | 4-methyl-2-sulfophenyl | fluorine | morpholino | 30:70 | bluish red |
| 22 | 4-(β-sulfatoethyl-sulfonyl)phenyl | fluorine | morpholino | 4-methoxy-2-sulfophenyl | fluorine | " | 30:70 | bluish red |
| 23 | 2-methoxy-5-(β-sulfatoethyl-sulfonyl)phenyl | fluorine | morpholino | 2-carboxyphenyl | fluorine | " | 50:50 | bluish red |
| 24 | 4-(β-sulfatoethyl-sulfonyl)phenyl | fluorine | morpholino | 1,5-disulfonaphth-2-yl | fluorine | " | 60:40 | red |
| 25 | 4-(β-sulfatoethyl-sulfonyl)phenyl | chlorine | morpholino | 1,5-disulfonaphth-2-yl | chlorine | " | 60:40 | red |
| 26 | 4-(β-sulfatoethyl-sulfonyl)phenyl | chlorine | 3-sulfo-phenylamino | 1,5-disulfonaphth-2-yl | chlorine | 3-sulfo-phenylamino | 50:50 | red |
| 27 | 1-sulfo-6-(β-sulfato-ethylsulfonyl)naphth-2-yl | fluorine | phenylamino | 3-{2'-chloro-4'-]β-(4"-(β'-sulfatoethyl-sulfonyl-phenyl)ethylamino]-1',3',5'-triazin-6'-yl}amino-6-sulfophenyl | fluorine | phenylamino | 70:30 | bluish red |

What is claimed is:

1. A dye mixture consisting essentially of one or more dyes of the formula (1), and one or more dyes of the formulae (2) or (3) or a mixture of formulae (2) and (3) in a mixing ratio of 70:30% by weight to 30:70% by weight:

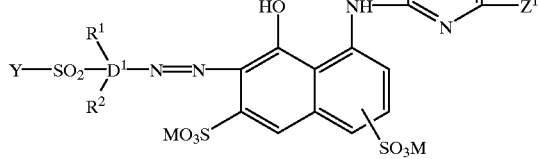

(1)

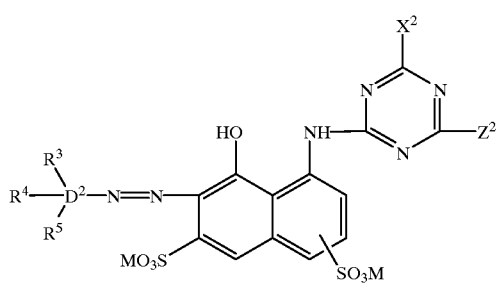

(2)

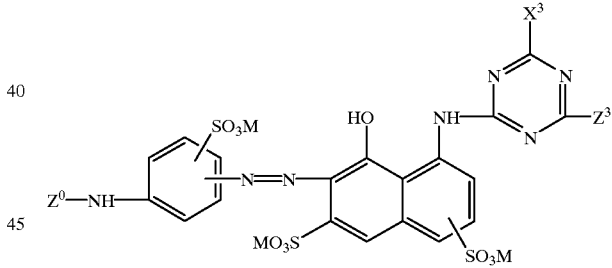

(3)

where:

M is hydrogen or an alkali metal;

$D^1$ is a benzene or naphthalene radical;

$D^2$ is a benzene or naphthalene radical;

Y is vinyl or is ethyl which is substituted in the β-position by an alkali-eliminable substituent;

$R^1$ is hydrogen, alkyl of 1 to 4 carbon atoms, or alkoxy of 1 to 4 carbon atoms, when $D^1$ is a benzene radical, or is hydrogen or sulfo, when $D^1$ is a naphthalene radical;

$R^2$ is hydrogen, alkyl of 1 to 4 carbon atoms, or alkoxy of 1 to 4 carbon atoms, when $D^1$ is a benzene radical, or is hydrogen or sulfo, when $D^1$ is a naphthalene radical;

$R^3$ is hydrogen, alkyl of 1 to 4 carbon atoms, alkoxy of 1 to 4 carbon atoms, carboxyl or sulfo, when $D^2$ is a benzene radical, or is hydrogen or sulfo, when $D^2$ is a naphthalene radical;

$R^4$ is hydrogen, alkyl of 1 to 4 carbon atoms, alkoxy of 1 to 4 carbon atoms, or sulfo, when $D^2$ is a benzene radical, or is hydrogen or sulfo, when $D^2$ is a naphthalene radical;

$R^5$ is hydrogen, chlorine, bromine or sulfo when $D^2$ is a benzene radical, or is hydrogen or sulfo when $D^2$ is a naphthalene radical;

$X^1$ is fluorine, bromine or chlorine;

$X^2$ is fluorine, bromine or chlorine;

$Z^1$ is a group of the general formula (4a) or (4b)

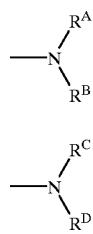

(4a)

(4b)

where $R^A$ is hydrogen or alkyl of 1 to 4 carbon atoms, which is optionally substituted with sulfo, carboxyl, methoxy, ethoxy, sulfato, phosphate, acetoxy, propionyloxy or hydroxyl, $R^B$ is hydrogen or alkyl of 1 to 4 carbon atoms, which is optionally substituted with sulfo, carboxyl, methoxy, ethoxy, sulfato, phosphate, acetoxy, propionyloxy or hydroxyl, or the group —$NR^AR^B$ forms the radical of a 5- or 7-membered saturated heterocycle wherein the alkylene radical of this heterocycle is optionally additionally interrupted by 1 or 2 hetero groups, $R^C$ is hydrogen or alkyl of 1 to 4 carbon atoms, which is optionally substituted with sulfo, carboxyl, sulfato or hydroxyl, and $R^D$ is hydrogen or phenyl, which is optionally substituted by 1 or 2 substituents selected from the group consisting of alkyl of 1 to 4 carbon atoms, alkoxy of 1 to 4 carbon atoms, carboxyl, sulfo and chlorine;

$Z^2$ has one of the meanings mentioned for $Z^1$;

$X^3$ is fluorine, bromine or chlorine;

$Z^3$ has one of the meanings mentioned for $Z^1$;

$Z^0$ is a group of the formula (5a), (5b), (5c) or (5d)

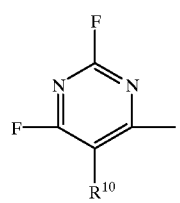

(5a)

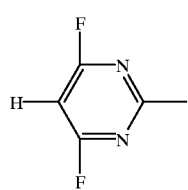

(5b)

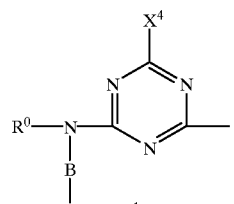

(5c)

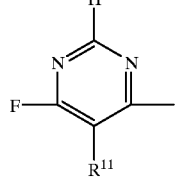

(5d)

where $R^{10}$ is hydrogen or chlorine;

$R^{11}$ is hydrogen, chlorine or fluorine;

$R^0$ is hydrogen, alkyl of 1 to 4 carbon atoms, phenyl or chlorine-, sulfo-, methyl-, ethyl-, methoxy-, ethoxy- or carboxyl-substituted phenyl;

$X^4$ has one of the meanings of $X^1$;

$Y^1$ has one of the meanings of Y;

B is alkylene of 2 to 6 carbon atoms, or is alkylenephenylene or phenylenealkylene each containing an alkylene of 2 to 4 carbon atoms, wherein the phenylene radicals are optionally substituted by 1 or 2 substituents selected from the group consisting of methyl, methoxy, ethyl and ethoxy, or is alkylene of 3 to 8 carbon atoms which is interrupted by 1 or 2 hetero groups;

the one —$SO_3M$ group in the sulfoaminonaphthol radicals of the formulae (1), (2), (3) is attached to the naphthalene radical in a position which is meta or para relative to the NH group;

the azo group in the formula (3) is attached to the benzene nucleus in a position which is meta or para relative to the $Z^0$—NH-group.

2. The dye mixture as claimed in claim 1, wherein $D^2$ is a naphthalene radical, $R^3$ is hydrogen, $R^4$ is hydrogen or sulfo and $R^5$ is hydrogen or sulfo.

3. The dye mixture as claimed in claim 1, wherein $X^1$ and $X^2$ are both fluorine.

4. A dye mixture as claimed in claim 1, comprising one or more dyes of the formula (1) and or more dyes of the formula (2) or (3) or a mixture of formulae (2) and (3) in a mixing ratio of 60:40% by weight to 40:60% by weight.

5. A dye mixture as claimed in claim 1, wherein $D^1$ or $D^2$ or both are a benzene nucleus.

6. A dye mixture as claimed in claim 1, wherein $R^1$ is hydrogen, methyl or methoxy and $R^2$ is hydrogen, methyl or methoxy.

7. A dye mixture as claimed in claim 1, wherein $R^1$ and $R^2$ are both hydrogen.

8. A dye mixture as claimed in claim 1, wherein $D^2$ is a naphthalene radical, $R^3$ is hydrogen, $R^4$ is hydrogen or sulfo and $R^5$ is hydrogen or sulfo.

9. A dye mixture as claimed in claim 1, wherein $X^1$ and $X^2$ are both fluorine.

10. The dye mixture as claimed in claim 1, wherein $R^1$ and $R^2$ are both hydrogen.

11. A process for dyeing hydroxyl- and/or carboxamido-containing material, which comprises applying said dye mixture as claimed in claim 1 to the material and fixing them on the material by (a) means of heat, (b) with an alkaline agent or (c) by means of heat and with an alkaline agent.

12. The dye mixture as claimed in claim 1, wherein $D^1$ or $D^2$ or both are a benzene nucleus.

13. The dye mixture as claimed in claim 1, wherein $R^1$ is hydrogen, methyl or methoxy and $R^2$ is hydrogen, methyl or methoxy.

14. The dye mixture as claimed in claim 4, wherein $D^1$ or $D^2$ or both are a benzene nucleus.

15. The dye mixture as claimed in claim 4, wherein $R^1$ is hydrogen, methyl or methoxy and $R^2$ is hydrogen, methyl or methoxy.

16. The dye mixture as claimed in claim 4, wherein $R^1$ and $R^2$ are both hydrogen.

17. The dye mixture as claimed in claim 4, wherein $D^2$ is a naphthalene radical, $R^3$ is hydrogen, $R^4$ is hydrogen or sulfo and $R^5$ is hydrogen or sulfo.

18. The dye mixture as claimed in claim 4, wherein $X^1$ and $X^2$ are both fluorine.

19. A dye mixture comprising one or more dyes of the formula (1) and one or more dyes of the formula (3)

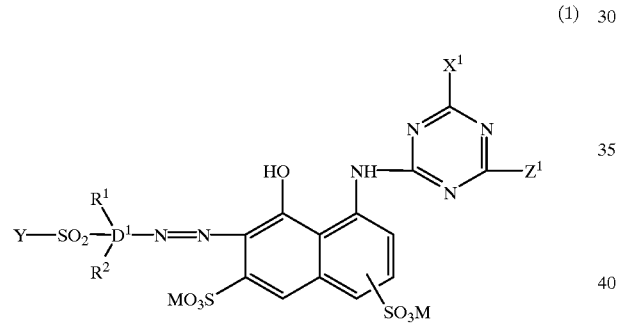

(1)

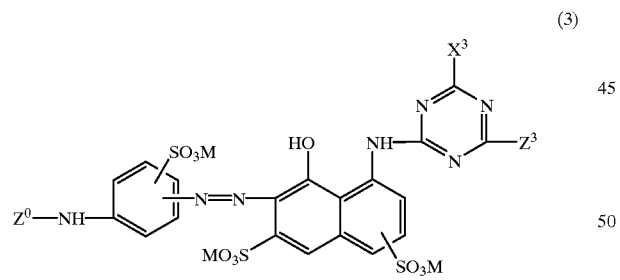

(3)

where:

M is hydrogen or an alkali metal;

$D^1$ is a benzene or naphthalene radical;

Y is vinyl or is ethyl which is substituted in the β-position by an alkali-eliminable substituent;

$R^1$ is hydrogen, alkyl of 1 to 4 carbon atoms, or alkoxy of 1 to 4 carbon atoms, when $D^1$ is a benzene radical, or is hydrogen or sulfo, when $D^1$ is a naphthalene radical;

$R^2$ is hydrogen, alkyl of 1 to 4 carbon atoms, or alkoxy of 1 to 4 carbon atoms, when $D^1$ is a benzene radical, or is hydrogen or sulfo, when $D^1$ is a naphthalene radical;

$X^1$ is fluorine, bromine or chlorine;

$Z^1$ is a group of the general formula (4a) or (4b)

(4a)

(4b)

where $R^A$ is hydrogen or alkyl of 1 to 4 carbon atoms, which is optionally substituted with sulfo, carboxyl, methoxy, ethoxy, sulfato, phosphate, acetoxy, propionyloxy or hydroxyl, $R^B$ is hydrogen or alkyl of 1 to 4 carbon atoms, which is optionally substituted with sulfo, carboxyl, methoxy, ethoxy, sulfato, phosphate, acetoxy, propionyloxy or hydroxyl, or the group —$NR^AR^B$ forms the radical of a 5- or 7-membered saturated heterocycle wherein the alkylene radical of this heterocycle is optionally additionally interrupted by 1 or 2 hetero groups, $R^C$ is hydrogen or alkyl of 1 to 4 carbon atoms, which is optionally substituted with sulfo, carboxyl, sulfato or hydroxyl, and $R^D$ is hydrogen or phenyl, which is optionally substituted by 1 or 2 substituents selected from the group consisting of alkyl of 1 to 4 carbon atoms, alkoxy of 1 to 4 carbon atoms, carboxyl, sulfo and chlorine;

$X^3$ is fluorine, bromine or chlorine;

$Z^3$ has one of the meanings mentioned for $Z^1$;

$Z^0$ is a group of the formula (5a), (5b), (5c) or (5d)

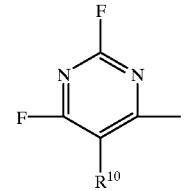

(5a)

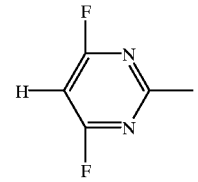

(5b)

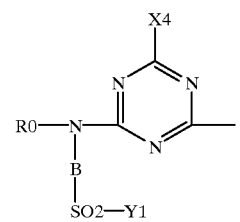

(5c)

-continued

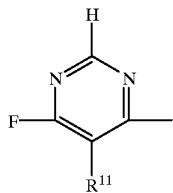
(5d)

where
$R^{10}$ is hydrogen or chlorine;
$R^{11}$ is hydrogen, chlorine or fluorine;
$R^0$ is hydrogen, alkyl of 1 to 4 carbon atoms, phenyl or chlorine-, sulfo-, methyl-, ethyl-, methoxy-, ethoxy- or carboxyl-substituted phenyl;
$X^4$ has one of the meanings of $X^1$;
$Y^1$ has one of the meanings of Y;

B is alkylene of 2 to 6 carbon atoms, or is alkylenephenylene or phenylenealkylene each containing an alkylene of 2 to 4 carbon atoms, wherein the phenylene radicals are optionally substituted by 1 or 2 substituents selected from the group consisting of methyl, methoxy, ethyl and ethoxy, or is alkylene of 3 to 8 carbon atoms which is interrupted by 1 or 2 hetero groups;

the one —$SO_3M$ group in the sulfoaminonaphthol radicals of the formulae (1), (2), (3) is attached to the naphthalene radical in a position which is meta or para relative to the NH group;

the azo group in the formula (3) is attached to the benzene nucleus in a position which is meta or para relative to the $Z^0$—NH-group.

* * * * *